(12) United States Patent
Mueller-Marc et al.

(10) Patent No.: US 8,553,314 B2
(45) Date of Patent: Oct. 8, 2013

(54) MULTI-COLORED DISPLAY DEVICE

(75) Inventors: Oliver Mueller-Marc, Appenzell (CH);
Dieter Jerosch, Bad Soden (DE);
Andriy Bitman, Dortmund (DE); Frank Bartels, Hattingen (DE)

(73) Assignee: Advanced Display Technology AG, Appenzell (CH)

( * ) Notice: Subject to any disclaimer, the term of this patent is extended or adjusted under 35 U.S.C. 154(b) by 295 days.

(21) Appl. No.: 13/053,278

(22) Filed: Mar. 22, 2011

(65) Prior Publication Data

US 2011/0235158 A1  Sep. 29, 2011

(30) Foreign Application Priority Data

Mar. 27, 2010  (DE) .......................... 10 2010 013 153

(51) Int. Cl.
*G02B 26/00* (2006.01)
*G09G 3/34* (2006.01)

(52) U.S. Cl.
USPC ............................ 359/296; 359/237; 345/107

(58) Field of Classification Search
USPC ......... 359/290, 295, 296, 245, 253–254, 265, 359/291, 292, 293, 315–318, 276, 238, 242, 359/259, 244, 198, 260–263, 223–225, 359/301–303, 237; 345/30, 48, 50, 60, 84, 345/32, 41, 105–107, 204, 34; 349/33; 252/500, 586

See application file for complete search history.

(56) References Cited

U.S. PATENT DOCUMENTS

| | | | |
|---|---|---|---|
| 5,956,005 A | 9/1999 | Sheridan | |
| 6,700,556 B2 * | 3/2004 | Richley et al. | 345/84 |
| 2007/0164981 A1 * | 7/2007 | Clarke et al. | 345/107 |
| 2012/0154886 A1 * | 6/2012 | Heikenfeld et al. | 359/228 |

FOREIGN PATENT DOCUMENTS

| | | | |
|---|---|---|---|
| WO | 2004068208 A1 | 8/2004 | |
| WO | 2009036272 A1 | 3/2009 | |

* cited by examiner

*Primary Examiner* — Dawayne A Pinkney
(74) *Attorney, Agent, or Firm* — Marshall & Melhorn, LLC

(57) ABSTRACT

The invention relates to a display device having at least one electrically controllable display element comprising a first and at least one further liquid, a plurality of fluidically closed volumes and at least one voltage source which is connected to an electrode array, wherein said volumes include flat visible subvolumes which stacked upon another along their shortest dimension, having associated second subvolumes which pass through those flat visible subvolumes which are underlying that flat visible subvolume which is associated with the respective second subvolume.

12 Claims, 5 Drawing Sheets

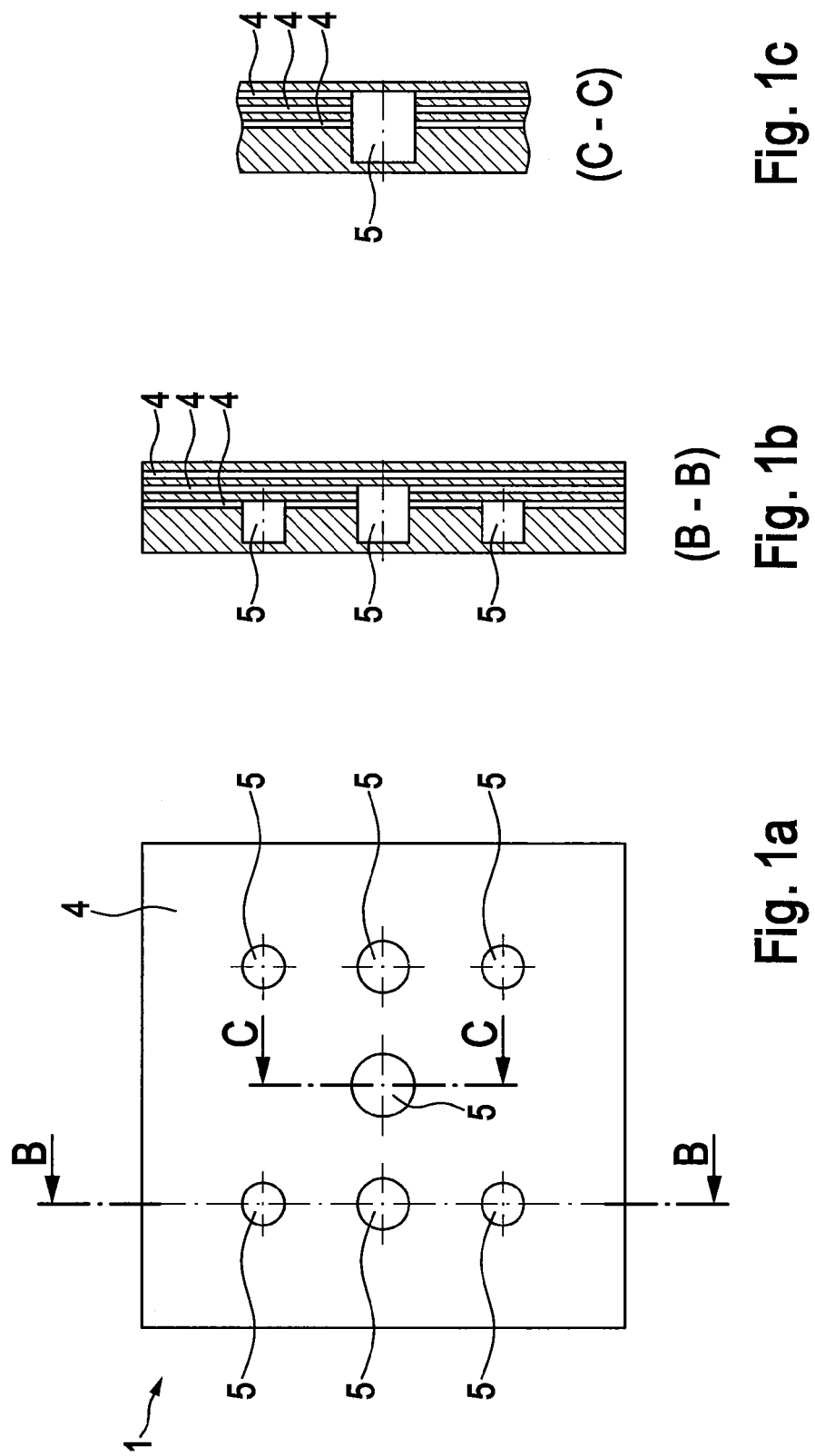

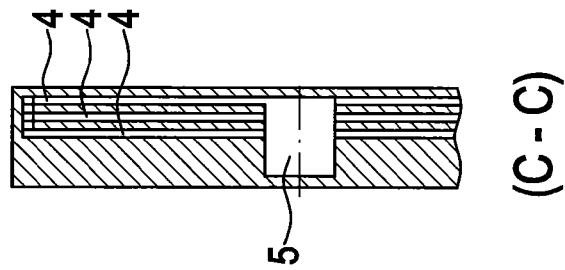
Fig. 2d (C - C)
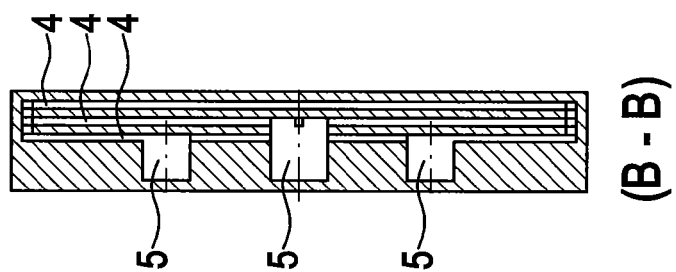
Fig. 2c (B - B)
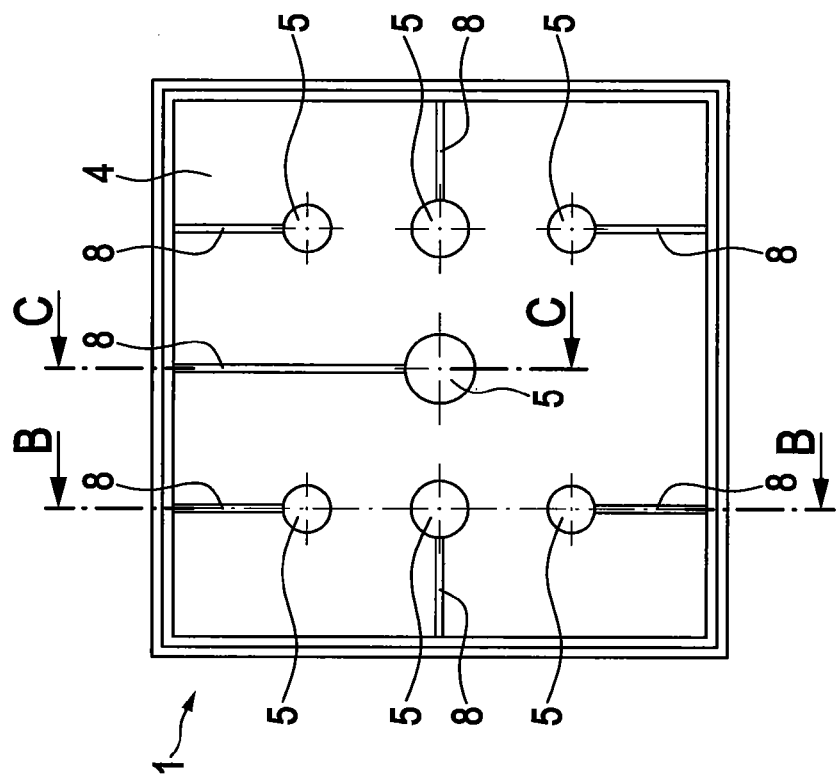
Fig. 2b

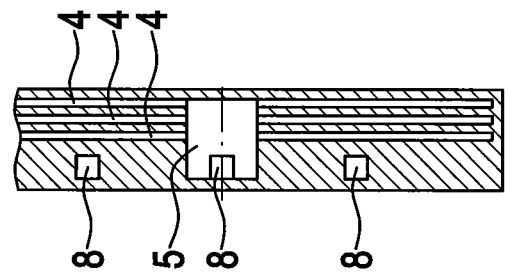
Fig. 3d (C-C)
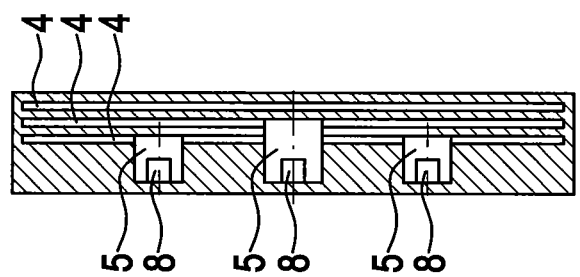
Fig. 3c (B-B)
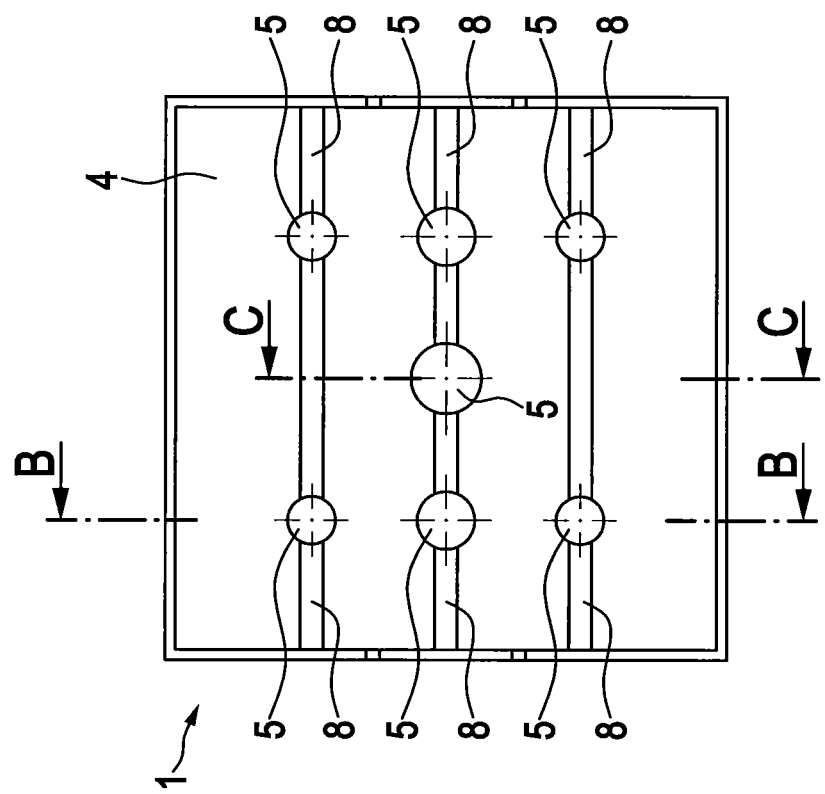
Fig. 3b

MULTI-COLORED DISPLAY DEVICE

BACKGROUND OF THE INVENTION

The invention relates to a display device having at least one electrically controllable display element. In particular, the invention relates to a display device which uses the effect of electrowetting.

It is known to realize displays with the aid of colored liquids which can be displaced between positions which are not visible and those which are visible for a viewer. An efficient means for displacing liquids is the so-called electrowetting wherein a voltage is supplied to an electrode array which is immediately adjacent to a liquid droplet, so that an electric field influences the liquid droplet causing that surface energy and therefore surface tension of the liquid increases. Depending on the configuration this can lead to spreading of the liquid on the electrode or covering the same completely, depending on which geometry and surface nature the electrode comprises and in which relative position liquid and electrode are located also with respect to the earth gravity field. It is known to provide the electrodes with a hydrophobic coating in order to achieve a maximum effect between the state of the liquid when the electrode is not supplied and when the electrode is supplied. With the aforementioned means it is already possible to realize a droplet movement without reverting to further functional elements.

Varying the surface energy incurs in case of a single droplet a variation of the contact angle at which the droplet wets the surface. The interrelation between fields strength and variation of contact angle is described by the Lippmann-Young equation and is known to the skilled person.

By a local variation of the electric field strength, therefore, the local surface energy of the liquid may be modified and thus, the geometry of a droplet can be changed locally. In particular, by generating a locally increased surface energy, a movement of the droplet may occur by extending preferably in the corresponding region which is characterized by presence of an electric field. Inversely, liquid is dragged from the influenced part of the droplet due to the surface tension out of the region where it is not influenced and therefore comprises a lower surface energy, since it tends in this region towards a geometry which is low-est in energy, namely that of a sphere. A net transport of liquid from the region of low field strength in the region of high field strength results thereby.

Based on these principles, a plurality of different display devices has already been realized. Commonly, it was always the objective to produce an electronically controllable bistable display element which selectively assumes one or the other state. Thus, it is for example known to reciprocate a liquid between a first and a second volume which are connected via a duct by means of the effect of electrowetting, wherein each volume comprises an associated electrode, so that the conveying direction respectively results from the ratio of field strength between both electrodes. Preferably, a potential is supplied respectively only to that electrode in which direction the liquid is to be conveyed.

U.S. Pat. No. 5,956,005 A discloses a display device having at least one electrically controllable display element each of them comprising a plurality fluidically closed volumes in which exactly one liquid having an electrically conductive or polar fraction and a non-polar fraction is present. Further, visible subvolumes are disclosed which are flat and stacked upon another.

An electrowetting based display device is known from WO 2009/036272 A1 wherein each display pixel is associated to a pair of electrodes forming a capacitor, by means of which a liquid which is located in the visible volume of the pixel, can be charged with an electric field. A backflow of the polar or electrically conducting liquid into a reservoir which is located in viewing direction to the display element below the visible display area is achieved by adjusting the geometries of the visible display volume and that of the reservoir such that the polar or electrically conducting liquid, if no electric field is supplied thereto, is forced into the reservoir due to the Young-Laplace pressure.

If a multi-colored display device were to be realized by means of the aforementioned technology, this would only be possible with the aid of a plurality of pixel comprising differently colored liquids which are arranged side by side on the display area. However, it is not possible to operate the device according to WO 2009/036272 A1 such that a single pixel may assume more than two color states. In particular, it is also not possible to represent mixed colors of at least two differently colored liquids and by means of a single pixel.

SUMMARY OF THE INVENTION

Therefore, it is the object of the invention to further develop the technology known from WO 2009/036272 A1 so that it does not longer comprise the aforementioned disadvantages. According to the invention, this object is solved by a display device according to patent claim 1. Preferred embodiments are subject-matter of the dependent claims.

A display device according to the invention includes at least one electrical controllable display element, comprising:
- a first liquid comprising a non-polar fraction and at least one further liquid comprising an electrically conductive or polar fraction, wherein said first and said at least further liquid are spatially separated from another and wherein said fractions are immiscible;
- a plurality of fluidically closed volumes, wherein each contains one of the further liquids comprising an electrically conducting or polar fraction, and a first liquid comprising a non-polar fraction and is subdivided into a first and at least one second subvolume which are fluidically connected, wherein said first subvolume is configured to be visible and the non-polar fraction is provided in said second subvolume when said electrically conducting or polar fraction is located in said first subvolume and vice versa;
- at least one voltage source which is supplied to an electrode array and which is adapted to selectively intersperse at least one of said visible subvolumes with an electric field and thereby to vary the surface tension of the electrically conducting polar liquid fraction;
- wherein said visible subvolumes are flat having dimensions which are selected such that the respective electrically conducting or polar liquid fraction in a de-energized state of the respective electrode array is forced into the respective second subvolume due to the Young-Laplace-pressure;
- and wherein said flat visible subvolumes are stacked upon another along their shortest dimension and said second subvolumes pass through the respective flat visible subvolumes which are underlying the respective flat visible subvolume associated to the respective second subvolume.

From the cited prior art, the skilled person will recognize that the flat configuration of the visible subvolumes provided according to the invention must in particular be understood to ensure the necessary application of Young-Laplace pressure to the electrically conducting or polar liquid fraction for functionality of the proposed display device when this fraction is located in the visible subvolume and is not influenced by an electric field. Moreover, the skilled person will know that when designing the flat visible subvolume and in particular its shortest dimension, also the design of the respective second subvolume must be considered or both subvolumes must be harmonized, respectively, in view of utilization of the Young-Laplace pressure.

For realizing a full colored display device, it may be provided that the display element comprises three fluidically closed volumes each containing only one cyan, magenta or yellow colored liquid presenting in an appropriate manner the electrically conducting or polar fraction of the liquid, whereas the non-polar fraction of the liquid is preferably transparent. If voltage source and electrode array are configured such that by means thereof the individual first subvolumes can be controlled separately and independently, the color tones from the CMY-color space can be formed corresponding to the subtractive color model by overlaying the respective liquids. If said first subvolumes, as provided for according to the invention, are immediately stacked upon another, and the (white) light impinging onto the display device propagates through all three first subvolumes, is filtered corresponding to the colored liquids present in said first subvolumes and is reflected back by a reflector which is located behind the bottommost first subvolume seen in light propagation direction.

In an embodiment of the invention, at least one volume is divided into a first subvolume and at least two second subvolumes. It is thereby preferred that the second subvolumes in their total amounts comprise a total volume which is sufficient to receive either the electrical conducting or polar or the non-polar liquid fraction entirely. Use of plural second subvolumes can be appropriate in particular if large area first subvolumes are to be filled and emptied as speedy as possible and uniformly.

It is in particular preferred in a display device according to the invention which comprises at least two volumes and therefore at least two first subvolumes, to configure the second subvolume which is associated with the uppermost first subvolume as a pot which is formed around the symmetry point of the uppermost first subvolume and according to the invention passes through those flat visible subvolumes which are underlying to the associated upper-most first subvolume. It is implied immediately that for deeper first subvolumes the associated second subvolumes must be arranged decentrally to avoid collision with the second subvolume of the uppermost first subvolume in the stack of layers.

Therefore, it may be reasonable to divide deeper layers into plural volumes which for example are simultaneously controllable and serve an identical color filtering.

The color filtering layers of a display device according to the invention, therefore, can be configured principally in two different ways. On the one hand, a single first subvolume can be provided for a layer which is fluidically connected to either one or plural second subvolumes. The second possibility is to assemble a coloring layer from plural volumes, wherein each volume in turn, as provided according to the invention, consists of a first subvolume and at least one second subvolume.

According to a further embodiment, the second subvolumes are configured as ducts, at least in the passage region to underlying subvolumes. By this, degradation of the display device by the second subvolume or the liquid fraction contained therein can be kept as low as possible. This may be for example realized in that the duct connects the first subvolume to a reservoir which is located below a lowest first subvolume, wherein said reservoir together with the duct forms the respective second subvolume.

Equally, it is possible in a further embodiment, that at least one second subvolume comprises a reservoir which is located below a lowest first subvolume and is fluidically connected with its associated first subvolume via at least two ducts.

In this way it is possible that a stack plane comprises plural first subvolumes which are fluidically separated from another.

When electric voltage is supplied, the electrically conducting or polar liquid fraction is drawn from the respective second subvolume into the associated first subvolume. In order to realize this process in an undisturbed manner it is appropriate to remove the non-polar fraction of the liquid from the first subvolume via backflow ducts and to transfer it into the second subvolume. If this equalization between liquid fractions would not be realized, a hydraulic bottleneck would occur hindering the movement of the liquid. Therefore, it is preferred to provide that the first subvolumes comprise backflow ducts which are embodied in form of a depression extending within the first subvolume along an outer border and leading at a specific site into that second subvolume.

By means of the depression it is simultaneously possible to limit spreading of the liquid within the first subvolume. Thus, it is provided according to a further embodiment that a first subvolume comprises at least two backflow ducts which are configured in form of a depression which extend within the first subvolume, wherein each depression is associated with another second subvolume and limits a closed range around a transition region from said first subvolume to the associated second subvolume. In this embodiment it is for example possible to concatenate a non-polar liquid fraction of all first subvolumes in one color plane having a common reservoir.

In a further embodiment, at least two second subvolumes are fluidically connected via a duct.

It is in particular preferred to provide that the first subvolumes are formed between transparent partitions which kept at a predetermined distance from another by means of supporting structures.

BRIEF DESCRIPTION OF THE DRAWINGS

The embodiment of the invention which are in particular preferred, are described with the aid of the following figures. It is shown in:

FIG. 1a a schematic top view to a display element according to the invention;

FIG. 1b a sectional view of the display element of FIG. 1a along a first line;

FIG. 1c a sectional view of the display element according to FIG. 1a along a second line;

FIG. 2b a top view to the display element of FIG. 2a;

FIG. 2c a sectional view of the display element according to FIGS. 2a and 2b along a first line;

FIG. 2d a sectional view of the display element of FIGS. 2a and 2b along a second line;

FIG. 3b a top view to the display element according to FIG. 3a;

FIG. 3c a sectional view of the display element according to FIGS. 3a and 3b along a first line; and FIG. 3d a sectional view of the display element according to FIGS. 3a and 3b along a second line.

DETAILED DESCRIPTION OF THE INVENTION

Figure 2A:
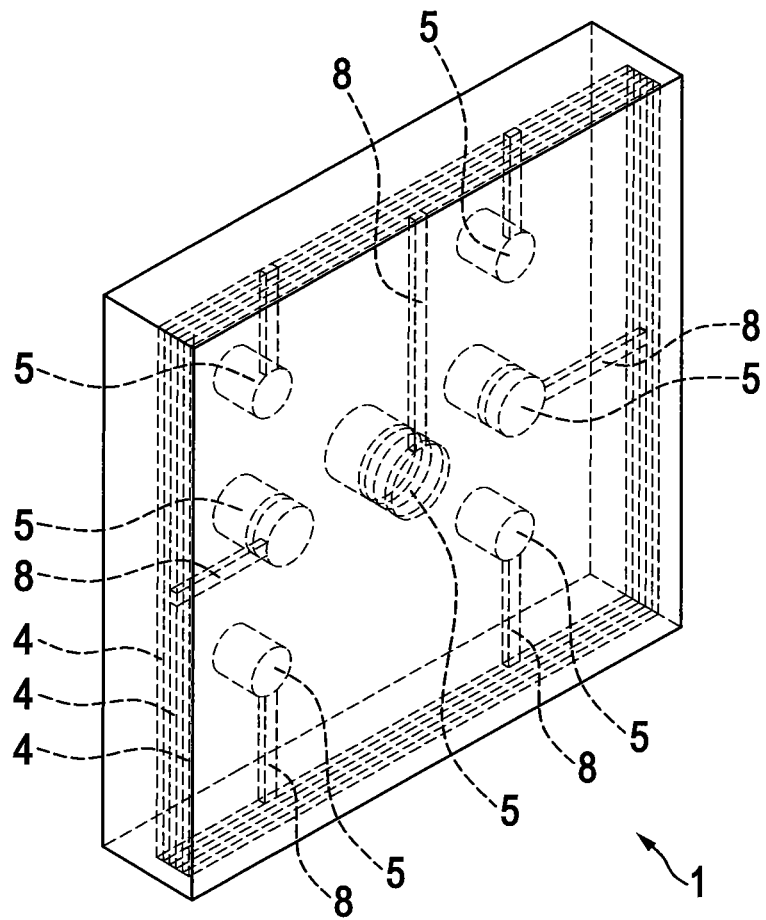
FIG. 2a a perspective view of a display element according to the invention.

FIG. 1a shows a schematic top view to a first embodiment of the display element 1 according to the invention. In the top view, first subvolumes 4 are visible and comprise transparent interlayers. Also shown are second subvolumes 5, wherein the represented embodiment provides that a second subvolume 5 which is centrally disposed in the representation, is associated to a first subvolume 4 which is arranged uppermost in viewing direction, whereas two second subvolumes 5 are associated, with a central first subvolume 4 which is arranged below the upper first subvolume 4. Four second subvolumes 5 are associated with the deepest first subvolume 4. Consequently, the exchange of liquids occurs with only one second subvolume 5 for the upper first subvolume 4, so that these appropriately comprise an identical volumetric capacity. The central layer of the first subvolume 4 is divided to two second subvolumes 5, wherein each appropriately comprises half of the volumetric capacity of the associated first subvolume. For the lowermost first subvolume 4, the liquid is divided to four second subvolumes 5, wherein each comprises a quarter of the volumetric capacity of the associated first subvolume 4.

FIG. 1b represents a sectional view of the display element of FIG. 1a taken along line B-B. Further to three first subvolumes 4, also two of the second subvolumes 5 are represented which are fluidically connected with the lowest first subvolume 4, whereas the central second subvolume in the representation is one of the two second subvolumes 5 according to FIG. 1a which are fluidically connected with the central first subvolume 4. In the sectional view C-C of FIG. 1c, also the second subvolume 5 can be recognized which is fluidically connected with the uppermost first subvolume 4 and, since it is the only second subvolume 5 which is connected to the uppermost first subvolume 5 it has, as indicated by its section, the largest volumetric capacity as seen from a combined view of FIGS. 1b and 1c.

A further embodiment of the display element 1 according to the invention is represented in FIGS. 2a to 2d. FIG. 2a is a perspective front view of the display element 1. Further to the first and second subvolumes 4, 5, backflow ducts 8 can be recognized which extend from an outer boarder of the respective first subvolume 4 to an associated second subvolume. As already described with reference to FIGS. 1a to 1c, it is provided also in this embodiment that in viewing direction to the display element, the upper first subvolume 4 is associated with only one second subvolumes 5, central first subvolume 4 is associated with two second subvolumes 5 and lowermost first subvolume 4 is associated with four second subvolumes 5.

In the top view of FIG. 2b, ducts 8 can once more be clearly recognized which on a shortest path between border of the respective first subvolume fluidically connects subvolume 5 associated with first subvolume(s) 4 on a shortest path.

Sectional view of FIGS. 2c and 2d in turn show the configuration of second subvolumes 5 of same or different planes according to the invention, wherein the flat visible subvolumes 4 are stacked upon another along their shortest dimension and the second subvolumes 5 pass through those flat visible subvolumes 4 which are arranged below that flat visible subvolume 4 associated with the respective second subvolume 5.

In the embodiment according to FIGS. 3a to 3d, in turn relating to a three layered construction, second subvolumes 5 which are associated with the central first subvolume 4 are fluidically connected to the second subvolume 5 which is associated with the uppermost first subvolume 4 via common backflow ducts 8. The same is true for respective two second subvolumes 5 which are associated with the lowermost first subvolume 4.

Figure 3A:
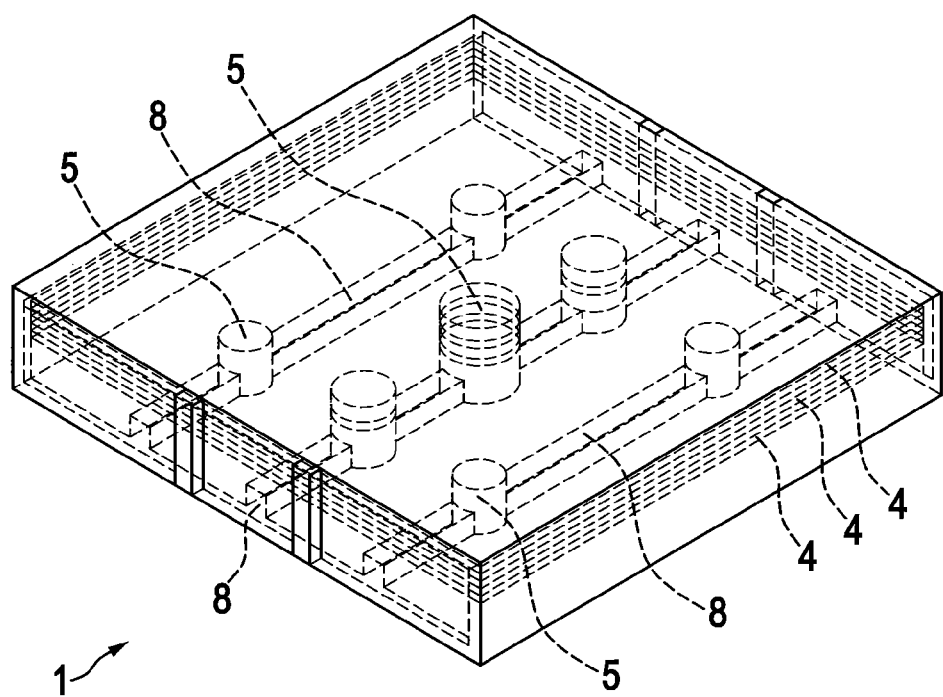
FIG. 3a a perspective view of a further embodiment of the display element according to the invention.

It can be found in FIG. 3b that the construction is such that second subvolumes 5 respectively lying in one line are fluidically connected via continuous ducts 8, so that in particular the advantage occurs that the display element 1 according to FIGS. 3a to 3d can be combined with further display elements 1 of same type in a particularly simple manner, by fluidically connecting the ducts 8 of respectively adjacent display elements 1. Equally, some or all subvolumes 5 may be fluidically connected.

Sectional views can be seen in FIGS. 3c and 3d, wherein in FIG. 3d also backflow ducts 8 are represented which fluidically connect second subvolumes 5 which are associated with the lowermost first subvolume.

Principally, there should be no limitation with respect to the arrangement of second subvolumes 5. Therefore, it is possible, to arrange them directly at the border of the display element 1.

What is claimed is:

1. A display device having at least one electrically controllable display element, comprising:

a first liquid comprising a non-polar fraction and at least one further liquid comprising an electrically conductive or polar fraction, wherein said first and said at least further liquid are spatially separated from another and wherein the fractions are immiscible;

a plurality of fluidically closed volumes, wherein each contains one of the further liquids comprising an electrically conducting or polar fraction, and the first liquid comprising a non-polar fraction and is subdivided into a first and at least one second subvolume which are fluidically connected, wherein said first subvolume is configured to be visible and the non-polar fraction is provided in said second subvolume when said electrically conducting or polar fraction is located in said first subvolume and vice versa; and at least one voltage source which is supplied to an electrode array and which is adapted to selectively intersperse at least one of said visible subvolume with an electric field and thereby to vary the surface tension of the electrically conducting polar liquid fraction;

wherein said first visible subvolume of each of said plurality of fluidically closed volumes are flat having dimensions which are selected such that the respective electrically conducting or polar liquid fraction in a de-energized state of the respective electrode array is forced into the respective second subvolume due to the Young-Laplace-pressure; and wherein a first set of said flat visible subvolumes are stacked upon another set of said flat visible subvolumes along their shortest dimension and the second subvolumes pass through the another set of said flat visible first subvolumes which are underlying the respective flat visible first subvolume which is associated with the respective second subvolume.

2. The display device of claim 1, wherein the at least one volume is divided into a first subvolume and at least two second subvolumes.

3. The display device of claims 2, wherein said second subvolumes in total amount comprise a total volume which is sufficient to completely receive either the electrically conducting or polar or the non-polar liquid fraction.

4. The display device of claims 1, wherein said second subvolumes are, at least in the passage region through underlying subvolumes are configured as ducts.

5. The display device of claim 4, wherein the duct below a lowest first subvolume leads into a reservoir which together with the duct forms a second subvolume.

6. The display device of claim 1, wherein at least a second subvolume comprises a reservoir which is located below a lowest first subvolume and which is fluidically connected with the associated first subvolume via at least two ducts.

7. The display device of claim 1, wherein a stack plane comprises plural first subvolumes which are fluidically separated from one another.

8. The display device of claim 1, wherein said first subvolumes comprise backflow ducts which are executed in form of a depression which extends within said first subvolume along an outer border and leads into said second subvolume at a specific site.

9. The display device of claim 2, wherein a first subvolume comprises at least two backflow ducts which are executed in form of depression which extend within said first subvolume, wherein each depression is associated with another second subvolume and borders a closed region around a transition from said first subvolume to the associated second subvolume.

10. The display device of claim 8, wherein at least two second subvolumes are fluidically connected via a duct.

11. The display device of claim 9, wherein at least two second subvolumes are fluidically connected via a duct.

12. The display device of claim 1, wherein said first subvolumes are formed between transparent partitions which are kept at a predetermined distance from another by means of supporting structures.

* * * * *